(12) United States Patent
Schmidt

(10) Patent No.: US 8,167,167 B2
(45) Date of Patent: May 1, 2012

(54) SEMI-SOLID METERING MACHINES WITH OPENING ACCESS FOR CLEANING

(76) Inventor: Norman G. Schmidt, Burnaby (CA)

( * ) Notice: Subject to any disclaimer, the term of this patent is extended or adjusted under 35 U.S.C. 154(b) by 374 days.

(21) Appl. No.: 12/385,733

(22) Filed: Apr. 17, 2009

(65) Prior Publication Data

US 2009/0321473 A1 Dec. 31, 2009

Related U.S. Application Data

(60) Provisional application No. 61/071,337, filed on Apr. 22, 2008.

(51) Int. Cl.
*G01F 11/00* (2006.01)
(52) U.S. Cl. .............................. 222/1; 222/148; 222/272
(58) Field of Classification Search .................. 222/272, 222/271, 148, 367, 410; 134/33, 59; 426/504
See application file for complete search history.

(56) References Cited

U.S. PATENT DOCUMENTS

| | | | |
|---|---|---|---|
| 216,617 A | | 6/1879 | Jaquette |
| 1,112,275 A | * | 9/1914 | Dueber .......................... 222/272 |
| 1,890,533 A | | 12/1932 | Sollich |
| 1,985,275 A | | 12/1934 | Baccelleri |
| 2,246,106 A | | 6/1941 | Sylvester |
| 2,321,082 A | | 6/1943 | Harshberger |
| 3,196,913 A | | 7/1965 | Bernhardt |
| 3,201,005 A | * | 8/1965 | Buhr et al. ..................... 222/272 |
| 3,240,401 A | * | 3/1966 | Kirschmann ................. 222/311 |

(Continued)

FOREIGN PATENT DOCUMENTS

GB 2039266 8/1980

*Primary Examiner* — Kevin P Shaver
*Assistant Examiner* — Donnell Long
(74) *Attorney, Agent, or Firm* — Tangent Law Group, PLLC; Eric J. Weierstall, esq.

(57) ABSTRACT

The invention is directed to a semi-solid food product metering device and method of operating a semi-solid food product metering device with at least two counter rotating feed rollers each with two ends, a distal end and a proximal end. An at least two feed rollers end plates contain the rollers with a first of the at least two roller end plates being a distal feed roller end plate at the distal end of the at least two counter rotating feed rollers and a second of the at least two roller end plates being a removable end plate at the proximal end of the counter rotating feed rollers with an at least one fastening device to fasten the at least two feed roller end plates in the operational position. An at least one frame support couples the at least two end plates, where the semi-solid food product metering device has a non-operational position and an operational position and is transitioned therebetween by a user, such that when in the operational position the semi-solid food product metering device is in operation and the at least one support bar supports the at least two feed roller end plates in the operating position with the at least one affixing device securing the end plates. When in the non-operational position, the device is not in operation, the affixing device is not securing the end plate and allows for movement, removal, or movement and removal of the second of the at least two end plates away from the end of the two counter rotating feed roller to provide access to a gap between the at least two counter rotating feed roller ends and the two end plates in the non-operational position.

14 Claims, 5 Drawing Sheets

U.S. PATENT DOCUMENTS

| | | | |
|---|---|---|---|
| 3,245,110 A | 4/1966 | Gerard et al. | |
| 3,326,144 A * | 6/1967 | Palmer | 222/281 |
| 3,486,484 A | 12/1969 | Bullough | |
| 3,565,014 A | 2/1971 | Mendoza | |
| 4,083,668 A | 4/1978 | Bardwick | |
| 4,211,492 A | 7/1980 | Konig | |
| 4,498,635 A | 2/1985 | Fielding | |
| 4,723,614 A * | 2/1988 | Lahti | 177/120 |
| 4,951,494 A * | 8/1990 | D'Alterio | 72/199 |
| 5,201,441 A * | 4/1993 | Hoppe et al. | 222/368 |
| 5,316,195 A * | 5/1994 | Moksnes et al. | 222/146.6 |
| 5,516,011 A | 5/1996 | Fielding | |
| 5,733,583 A | 3/1998 | Muller | |
| 5,811,145 A | 9/1998 | Morikawa | |
| 5,824,349 A | 10/1998 | Muller | |
| 5,919,495 A | 7/1999 | Fletcher et al. | |
| 6,050,456 A | 4/2000 | Soper et al. | |
| 6,344,227 B1 | 2/2002 | Schmidt | |
| 7,182,588 B2 * | 2/2007 | Lambauer et al. | 425/101 |
| 7,442,026 B2 * | 10/2008 | Shulski et al. | 425/237 |
| 2005/0257692 A1 | 11/2005 | Marcato | |

* cited by examiner

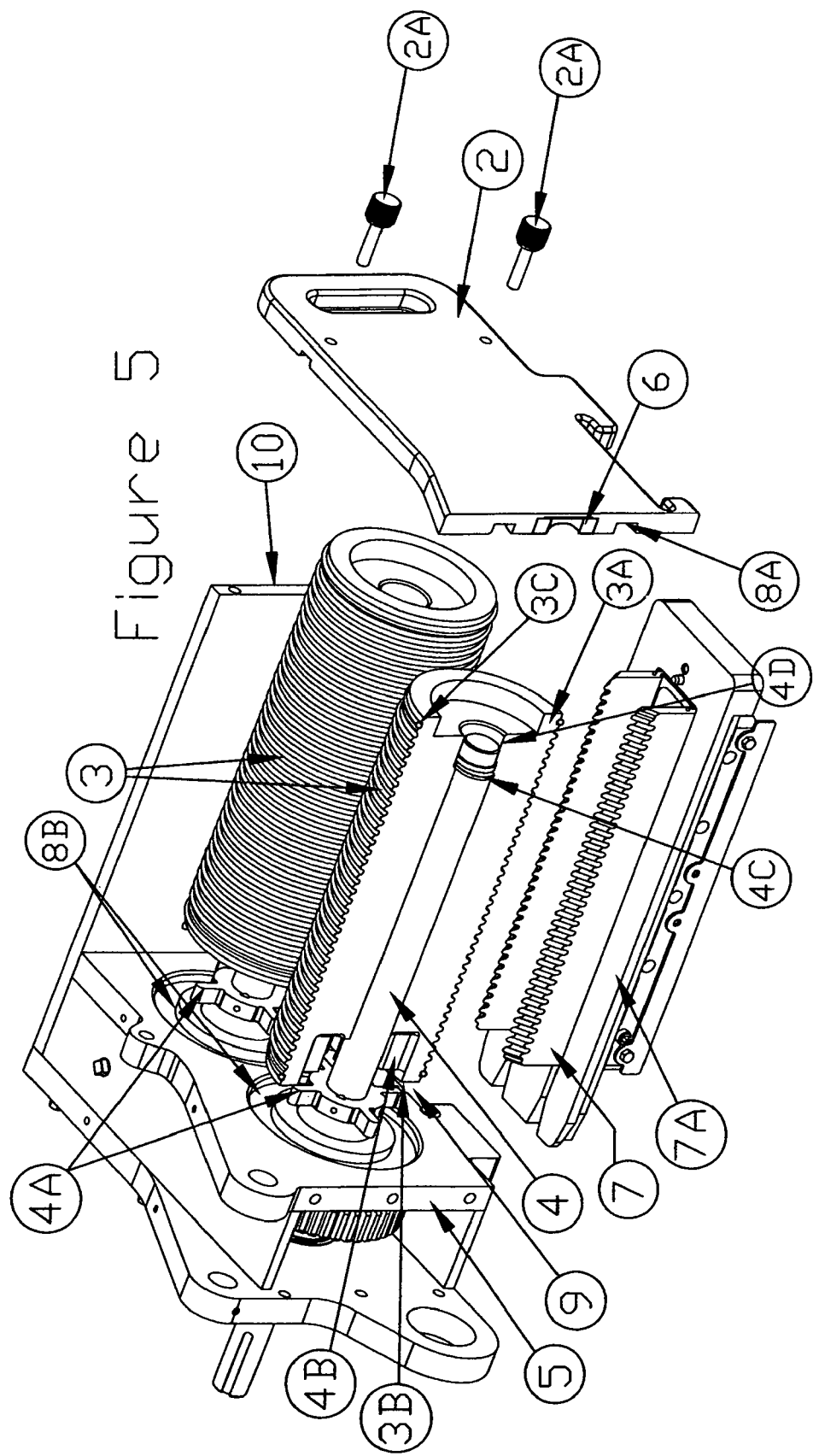

SEMI-SOLID METERING MACHINES WITH OPENING ACCESS FOR CLEANING

CROSS-REFERENCE TO RELATED APPLICATIONS

This application claims the priority of U.S. provisional patent application 61/071,337, filed Apr. 22, 2008, which is incorporated herein by reference.

BACKGROUND OF INVENTION

In the production of food products such as cookies, candies, icing of cakes, dough and other food and non food products that may be a semi-solid material there is always a need to pump or move the bulk material and meter it. The instant invention is directed to machines typically used in the production of cookies, hard and soft candies, confectionary products and other food and non food products using at least two counter rotating rollers with end plates, such as but not limited to parallel end plates that are placed at close proximity to the ends of the counter rotating roller pair. The counter rotation of the rollers grip and cause semi-solid mediums placed on the top of the rollers to become entrained and pass through the pinch point of the rolls, as described in the inventor's co-pending application device for controlled metering of semi-solid food products, incorporated herein by reference. The drive or gripped passage of the semi-solid medium puts pressure on the semi-solid medium and pushes the medium toward the pinch point of the feed rollers. This pressure is then used to move the semi-solid medium through the pinch point of the feed rollers and out the other side to form a sheet or layer of material or the semi solid materials may be directed into a die block located beyond the feed rollers. The die block being the device that shapes the semi-solid medium into the desired extruded form.

The close proximity of the ends of the feed rollers to the roller end plates is meant to constrain the semi-solid medium causing it to pass through the pinch point of the feed rollers, eliminating the semi-solid medium from passing between the feed roller ends and the mating roller end plates.

Prior art machines provide a clearance spacing between these components, this is necessary to ensure the proper operation of the feed rollers. However this clearance space, although small, allows some semi-solid material to seep between the feed roller ends and the end plates, contaminating the machine, with no easy option when it comes time to clean the machine other than full disassembly. Even with tight clearances a certain amount of semi-solid medium will still enter into the clearance space between the feed roller ends and the roller end plates.

With prior art machines this clearance has presented a location for residual semi-solid materials to collect. This collected semi-solid material has always posed a problem in that the clearance spacing between the feed roller ends and the end plates is difficult to access. This clearance spacing is near impossible to clean efficiently because with prior art machines the end plates are fixed with reference to the feed roller ends and the clearances are small and tight, making access for efficient cleaning very difficult even with liquid sprayers. Being difficult to clean, this area has always been a sanitation issue as well as an area where allergens, such as but not limited to peanuts or other pieces of additives, become lodged and at a later time may exit into a product that is normally considered to be free of the material. This is especially problematic if the material is an allergen like peanuts. Thus the instant invention provides a mechanical means by which the clearance space or gap between the feed roller ends and the mating end plates may be cleaned or access to this area may be easily obtained allowing for proper and efficient cleaning of residual process materials.

Thus the instant invention provides a mechanical solution by which a sealing system is incorporated between the roller end and the mating end plate plus a means of opening this area to allow for proper and efficient cleaning of residual process materials.

SUMMARY OF INVENTION

The invention allows for the implementation of replaceable seals between the feed roll ends and the roller end plates as well as a mechanism to open the area between the feed roll ends and the roller end plates on machines that are used in the production of, for instance but not limited to, dough products as in dough, dough with inclusions, hot cross buns, cookies, cookies with inclusions, confectionary items, chocolate coated candy centers, brownie batter, icing. The invention has a manually operated, mechanical solution that allows for removal of the outer end plate and pull out movement of the feed roller(s) from the distal feed roller end plate allowing quick access to area between feed roller ends and mating roller end plates without necessitating the need to disassemble the machine. Similarly, the system may be employed in non-food equipment. The purpose of providing an opening between the feed roller ends and the end plates in the case of confectionary machines is to gain access to this recess to allow proper cleaning of the device, complete sanitation and the removal of possible allergens. Prior art machines do not possess this ability, as their feed rollers are fixed in relation to the end plates.

An object of the invention is to provide improved access to clean and maintain semi-solid food product metering devices.

A further object is to provide a quick disassembly mechanism to aid in opening a semi-solid food product metering devices. In an open position to provide improved access to a pair of rollers and allow for cleaning and sanitizing.

The method of the invention includes a method for opening a semi-solid food product metering device comprising the steps of operating the semi-solid food product metering device in an operating position to meter semi-solid food product, the semi-solid food product metering device having a pair of rollers having a distal and a proximal end, two roller end plates the distal end plate which is fixed to the main drive assembly of the machine and the proximal end plate which is removable, seals located on either end of the feed rollers which provide a positive seal between the distal and proximal end plates to the distal and proximal end of the feed rollers, an at least one support or frame plate having the distal end plate supported thereon and allowing the attachment of the proximal end plate thereto. For cleaning the fastening devices located on outside of the proximal end plate may be opened or removed and the proximal end plate removed exposing the proximal ends of both of the feed rollers. The feed roller may then be pulled along the feed roller shaft where the feed roller drive end counter bore end will thereby disengage from bore of the distal feed roller end plate and away from feed roller drive coupling thereby allowing for cleaning access to the distal end of the feed roller and the area between the feed roller to distal feed roller end plate bore.

The method step of operating further provides the positive seal with a sealing element at each of the ends of the two counter rotating feed rollers, the positive sealing elements being engaged in the operating position simultaneously making contact with the feed roller end groove and the corresponding feed roller end plate—thereby producing a seal between the feed roller end and the associated feed roller end plate.

The apparatus of the invention includes a semi-solid food product metering device having two counter rotating feed rollers with ends, two roller end plates located at each end of the rollers, one being at a distal end of the rollers and the other at a proximal end of the rollers, and an at least one support bar or support frame or frame member. The semi-solid food product metering device has an operating position where the at least one frame member supports the distal end plate and proximal end plates while in the operating position and with the two roller end plates and the rollers in the operating position the semi-solid food product metering device is operated. Similarly, the semi-solid food product metering device has an operating position allowing for removal of the proximal end plate and longitudinal movement of the feed rollers along the roller shafts away from the distal feed roller end plate to allow access to the gap between the distal feed roller ends and the distal roller end plate in the open position.

A positive sealing element between the roller and the end plates can be provided. The positive sealing element can be, but is not limited to, a counter bore in each of the two end plates for receiving the ends of the two counter rotating feed rollers to provide a positive seal and the positive sealing element can be engaged in the operating position preventing leakage of the semi-solid material from said ends of the rollers and corresponding feed roller end plate of the rollers in the device. The positive sealing element can also include or be feed rollers fitted with end seal members that fit into mating seal sections or rings contained in mating roller end plates when the device is in the operating position.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

FIG. 5 shows an isometric side cut away view of the exemplary device of FIG. 1 in its open position where the removable feed roller end plate is displaced away from the end of the feed roller end. In the open position with the removable end plate removed and the feed roller slid out of the feed roller distal end plate counter bore along the feed roller shaft till the feed roller is clear of the feed roller drive coupling so as to allow the feed roller to freely spin about the axis of the feed roller drive shaft for the purpose of cleaning the feed roller, the feed roller ends and the feed roller end plate counter bores. Shown on this view are also the previously mentioned items of feed roller, feed roller shaft, feed roller drive coupling, feed roller retaining ring, removable end plate and removable end plate retaining fasteners.

Figure 1:
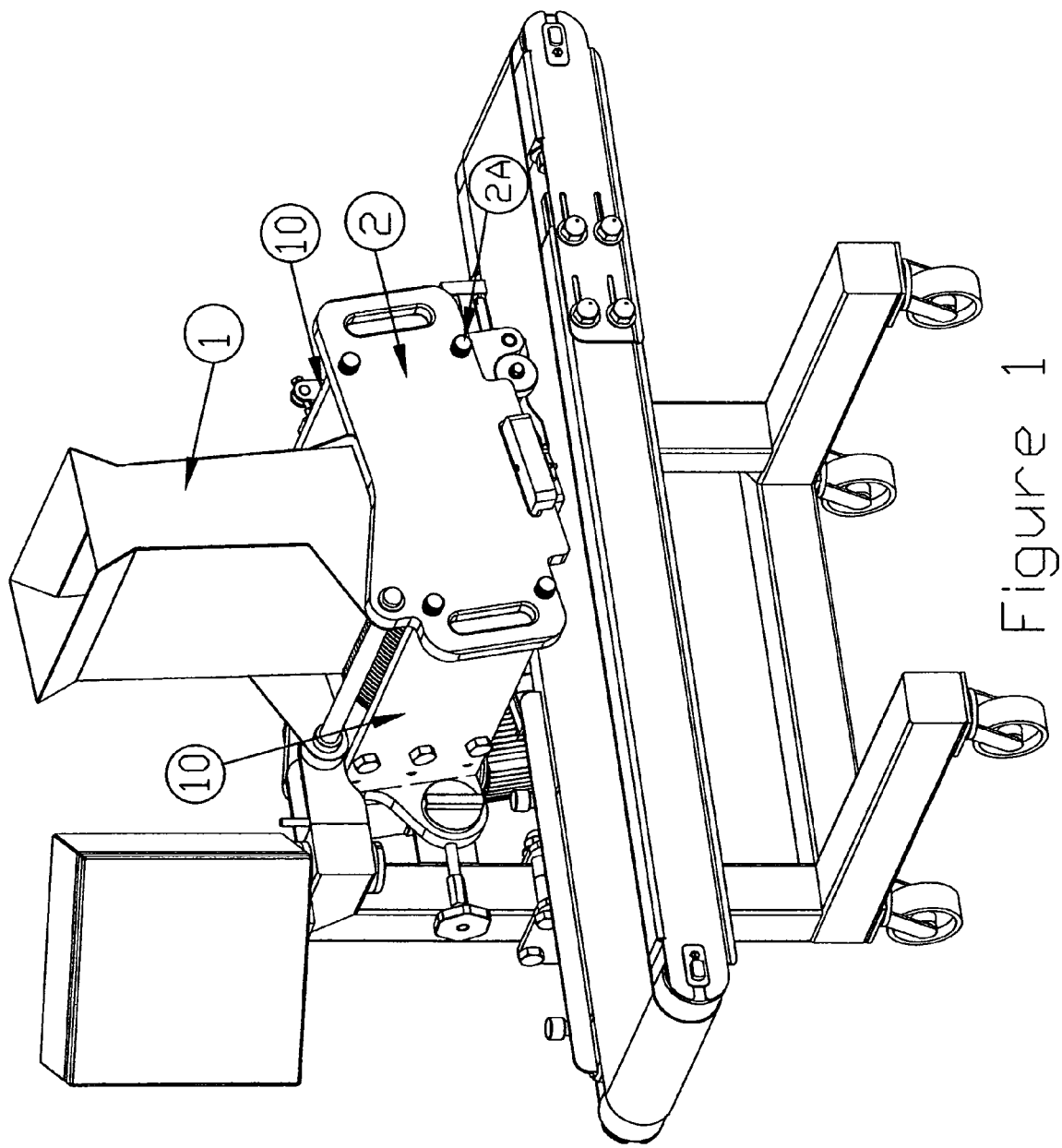
FIG. 1 shows an overall view of the exemplary device mounted above a conveyor as typical but not limited for the production of cookies.

The feed roller retaining ring is located on the feed roller shaft in a location to allow for longitudinal movement of the feed roller along the feed roller shaft so as to clear the feed roller drive coupling but retain the feed roller so that it does not slide off of the shaft. If removal of the feed roller is required it may be removed by first removing the feed roller retaining ring then sliding the feed roller entirely from the feed roller drive shaft.

This displaced feed roller position also showing the shaft drive coupling or shaft to roller drive member and the mating bore of the feeder roller that the feed roller drive member fits into and transmits the driving or rotational force of the feed roller shaft to the feed roller

DETAILED DESCRIPTION

The instant invention allows the removable feed roller end plate 2 to be removed allowing for movement of the feed roller 3 away from the feed roller counter bore 8b of the distal feed roller end plate 5. Distal feed roller end plate 5 can be fixed or movable. As discussed previously this is important as both feed rollers 3 as well as the roller end plates in existing and prior art designs are fixed in a position where only a small amount of clearance exists between the ends of the feed rollers and the end plates, creating a cleaning and hygienic issue. The existing designs small amount of clearance being a compromise between competing requirements, too large a clearance spacing would allow for significant passage of semi-solid product between the feed roller end and the roller end plate while too tight a clearance could cause the device to seize or lock up due to a very small amount of semi-solid product going in to the clearance spacing and with the operating, rotational rubbing friction between the feed roller ends and the roller end plates causing the captured semi-solid product to heat and bond the end of the feed roller to the feed roller end plate.

The existing, fixed clearance spacing of these designs would typically be in the area of, but certainly not limited to, 0.010 inches. It is considered normal that semi-solid materials would accumulate in this gap area with only a portion of these semi-solid materials being removable through normal exterior washing and for complete removal of materials requiring overly complicated sanitation with significant disassembly of the device and interruption in production. The instant invention solves these longstanding problems, satisfying the long felt need for improved access to these rollers for safety, productivity, and sanitary reasons.

Figure 2:
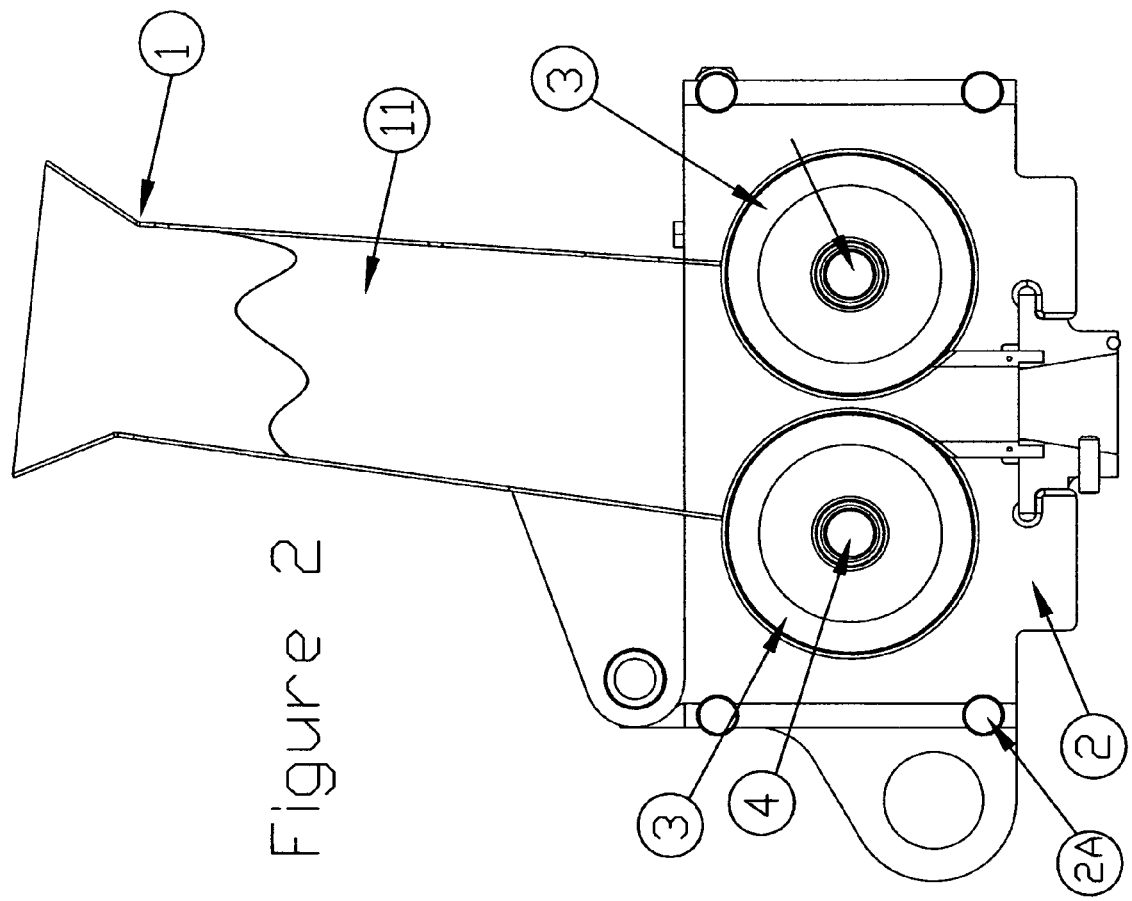
FIG. 2 shows an end view of the exemplary device of FIG. 1 with the feed material hopper in place.

FIG. 1 shows an isometric view of an exemplary device of the instant invention for forming semi-solid materials and FIG. 2 shows a cut away end view of FIG. 1. The figure shows the device with a hopper 11 for containing and transmitting a semi-solid food material 1 to the device. The exemplary embodiments provides a pair of counter rotating feed rollers 3 with extension sections feed roller ends 3A,3B located on both the feed roller 3 ends, which may be better viewed in FIG. 3 and FIG. 4.

Figure 3:
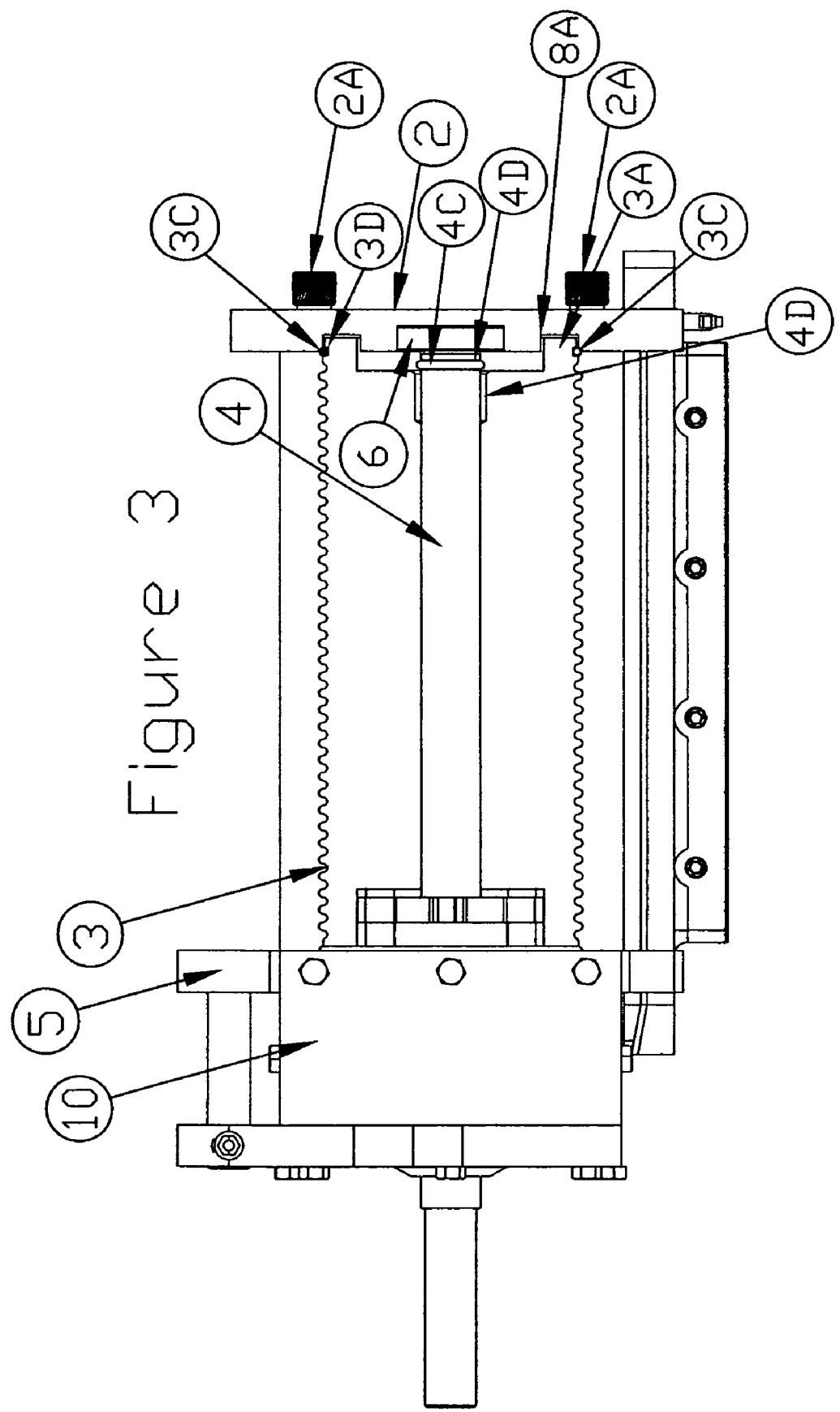
FIG. 3 is a cut away side view of an exemplary device of the instant invention for forming semi-solid materials with the hopper removed. Seen on this view are the feed roller, feed roll shaft, feed roller drive coupling, feed roller retaining ring, removable end plate, feed roller support bearing and removable end plate retaining fasteners.

FIG. 3 is a cut away side view of an exemplary device of the instant invention for forming semi-solid materials. This view shows the feed roller ends 3A, 3B that are located at the extremities of the feed rollers 3, inside the feed roller endplate counter bores 8A, 8B of the feed roller end plates proximal 2 and distal 5. One example of a seal is shown in the exemplary embodiment of FIG. 3, showing a positive seal at the end of the feed roller ends 3A where the feed roller end seal rings 3C are held in feed roller end seal grooves 3D contained in both of the feed roller ends 3A, 3B. Another non-limiting example of an alternative manner of sealing is to have feed rollers 3 that are fitted with end seals (not shown) that fit into or against mating seal sections or rings (not shown) contained in the mating feed roller end plates 2, 5. Various additional methods and structures may be incorporated to provide a positive seal at the end of the feed rollers 3 that is easily disengagable. These feed rollers 3 with seals 3C at the roller ends 3A, 3B provides increased sealing of semi-solid process materials preventing leakage or bypass of semi-solid process materials into the area between the feed roller ends 3A, 3B and the feed roller end plates 2, 5

Figure 4:
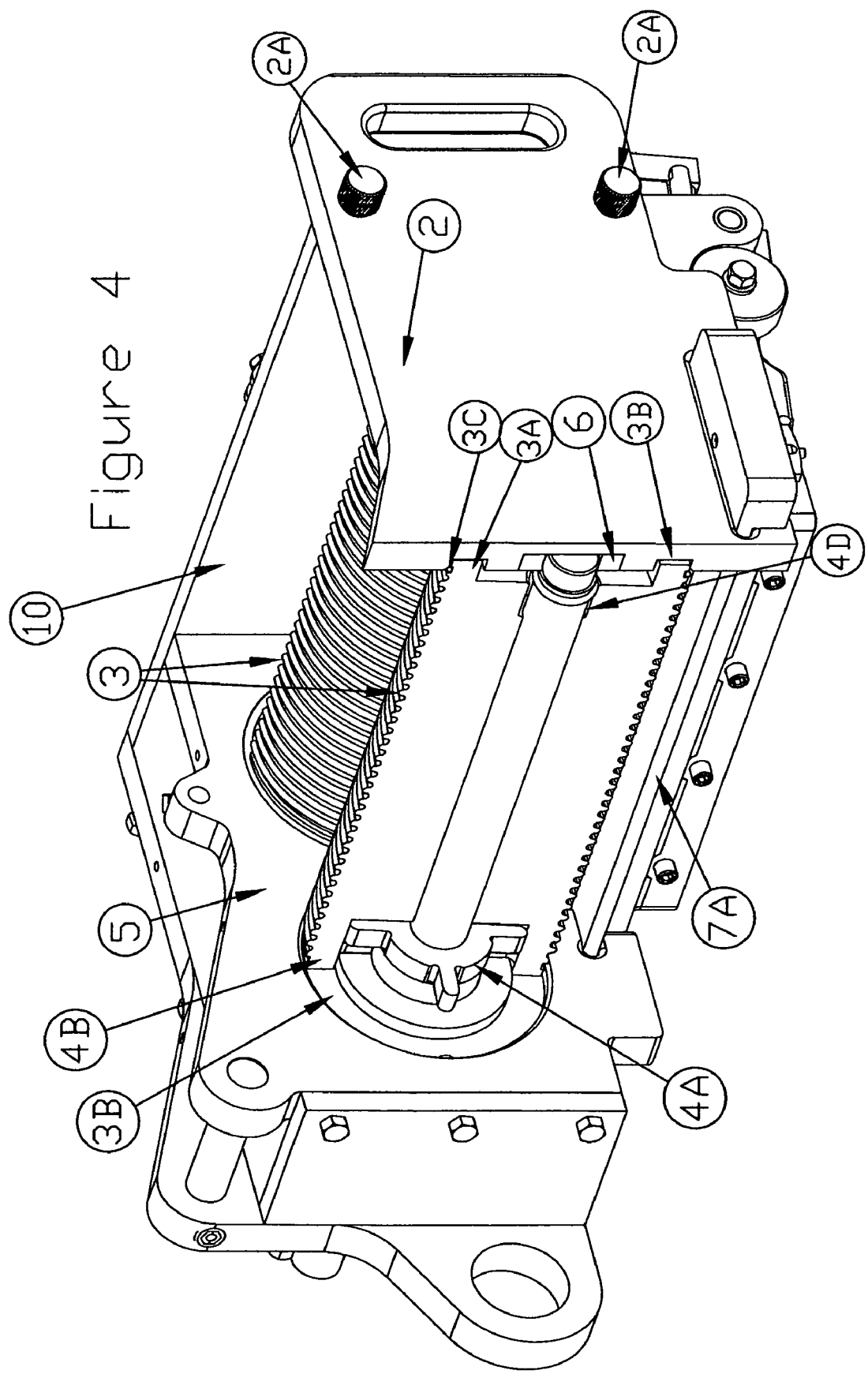
FIG. 4 shows an isometric side cut away view of the exemplary device of FIG. 1 in its closed operating position. Shown on this view are also the previously mentioned items of feed roller, feed roller shaft, feed roller drive coupling, feed roller retaining ring, removable end plate and removable end plate retaining fasteners.

FIG. 4 shows a cut away isometric view of an exemplary device of the instant invention for forming semi-solid materials and provides a good view of the same parts as listed previously for FIG. 3 as well as the engagement means of the feed roller shaft coupling 4A to the feed roller drive counter bore 4B. The feed roller ends 3A, 3B extend into mating counter bores 8A, 8B contained in the roller end plates 2, 5. As the feed roller ends 3A, 3B fit into the counter bores 8A, 8B of the roller end plates 2 and 5 they engage with feed roller seal areas or seals or seal members 3C as shown in FIG. 3 that are constructed so as to produce a positive seal between the feed roller ends 3A, 3B and the feed roller end plate counter bores 8A, 8B of distal feed roller end plate 5 and removable feed roller end plate 2.

The roller end plates 2, 5 are supported by frame support bars or frame members 10 which provide rigidity sufficient to hold the feed roller end plates 2, 5 in position but allow for removal of the removable feed roller end plate 2 and movement of the feed roller 3 away from the distal feed roller end plate 5 and the feed roller counter bores 8B which contains the feed roller end 3B.

FIG. 5 shows a cut away isometric view of an exemplary device of the instant invention for forming semi-solid materials in the open position with the removal of the removable feed roller end plate 2. This removal of the removable feed roller end plate 2 allows for access to the area of the proximal feed roller end 3A as well as to the feed roller counter bore 8A of the removable feed roller end plate 2. With subsequent sliding of the feed roller 3 along the feed roller shaft 4 to the point where the feed roller retaining ring 4C strikes the feed roller retaining ring counter bore 4E and the feed roller end 3B will slide out of the distal feed roller end plate 5 counter bore 8B. A gap 9 is created allowing for cleaning access to the feed roller end 3B and the feed roller end plate counter bore 8B. In this position it will also occur that the feed roller drive shaft coupling 4A will disengage from feed roller drive coupling counter bore 4B.

This disengagement will also provide for an operator or sanitation person to spin the feed roller about or on the longitudinal axis of the feed roller shaft 4 providing cleaning access to the circumference of the feed roller end 3B as well as the feed roller end 3A, distal end plate counter bore 8B, feed roller support bearing 6 and removable feed roller end plate counter bores 8A of the removable feed roller end plate. This access then allows for sanitation personnel to easily insert and use water hoses, pressure washers or similar sanitation devices to spray into these areas to remove residual materials and/or allergens.

Variations in the system of transmitting rotational drive from the feed roller drive shaft 4 to the feed rollers 3 are also contemplated by the inventor and may be accomplished by other similar mechanical means other than by the method shown in the manner suggested without deviating from the spirit of the invention.

The removal of the removable end plate 2 and movement of feed rollers 3 thereby causes or allows for the open access between the feed roller ends 3A, 3B and feed roller end plate counter bores 8A, 8B of the removable and distal feed roller end plate 2, 5 However, variations in the removal of the removable feed roller end plate 2 are contemplated by the inventor and may include mechanical, or similar removal or just a displacement method to allow for movement apart of the feed roller end plate 2, and movement of the feed roller end 3A from feed roller end plate counter bore 8A of the distal roller end plate 5 to allow for cleaning access in the manner suggested without deviating from the spirit of the invention. The movement provided is important in that it allows for improved access to the feed rollers and operation of the seals, as explained herein below.

In the opening of the device, the frame support bars 10 that hold the entire assembly and supply support and rigidity for the unit, do not move, only the removable feed roller end plate 2 is removed. The opening and/or removal of the removable feed roller end plate 2 as seen from FIG. 4 to FIG. 5 is accomplished by way of removal of end plate fasteners or fastening device 2a which allows for movement or removal of the removable feed roller end plate 2 from both the frame support bars or frame support bars 10 and the feed roller ends 3A and movement of the feed roller 3 along the feed roller drive shafts 4. In the exemplary embodiment of the instant invention shown in FIGS. 4 and 5 the fastening device 2a is shown as a set of knobs with threaded protrusions in which they fit, this is an non-limiting example of a fastening device and variations can be made without departing from the spirit of the invention.

For cleaning purposes, the feed rollers 3 remain on the feed roller drive shafts 4 and the removable feed roller end plate 2 is slid away or removed from both the frame support bars 10 and the feed roller ends 3A. The feed rollers 3 can then be slid along the longitudinal axis of the feed roller drive shafts 4 to the maximum travel along the feed roller drive shafts 4 as allowed by the feed roller retaining ring 4C. The gap or feed roller end gap 9 is created, being typically 1 to 2 inches in width, at the opening between the feed roller 3 and the distal feed roller end plate 5 in the open position. Once the feed roller end 3A is away from the distal feed roller end plate 5 and or away from the distal feed roller plate counter-bore 8A the open gap area 9 being sufficient to allow for cleaning by use of a water stream for washing and or any other specified sanitation method.

In the case where complete removal of the feed roller or rollers 3 is desired the feed roller retaining ring 4B which in this illustration is shown as, but is not limited to, a soft polymer ring typically referred to as an "O-Ring" may be removed allowing for complete removal of the feed roller or feed rollers 3 so as to allow for full access to the area of the distal end plate counter bore 8B and the feed roller end 3A as well as to the center bore of the feed roller 3. The roller retaining ring 4C may remain engaged while the device transitions from the operating to non-operating position to prevent the feed roller or rollers 3 from falling out of the device.

In the closing of the invention, the feed roller 3 is slid onto the feed roller drive shaft 4 with a feed roller drive counter bore 4B being the end first to slide onto the shaft. With continued sliding of the feed roller 3 on the feed roller shaft 4 the feed roller counter bore the feed roller drive coupling counter bore 4B will come in contact or engage with the feed roller drive coupling 4A. Upon further movement (provided the feed roller drive coupling counter bore 4B is aligned to the feed roller drive coupling 4A the feed roller drive counter bore 4B is engaged with the feed roller drive coupling 4A or drive device. Once the feed roller drive counter bore 4B and the feed roller drive coupling 4A are engaged the feed roller 3 may be further pushed till the feed roller end 3B enters into the distal feed roll end plate counter bore 8B and the feed roller end seal 3C contacts the distal feed roller end plate counter bore 8B. The removable feed roller end plate 2 will then be placed or slid on to the ends of the feed roller shafts. The ends of the feed roller shaft 4 will then engage into the feed roller shaft bearings 6 housed in the removable feed roller end plate 2. When the feed roller shafts 4 are slid into the feed roller shaft bearings 6 the removable feed roller end plate 2 will also come in contact with frame plates 10 where the removable end plate may now be located and fixed in position using the removable end plate fasteners 2A.

FIG. 4 shows a cross sectional view of an exemplary device of the instant invention for forming semi-solid materials showing the device in the closed position. This cross sectional view is along the center line of feed roller 3. It shows the feed roller ends 3A, 3B of the feed rollers 3 is contained within the counter bores 8A, 8B of the roller end plates 2, 5. Also shown is one of many possible methods for creating a seal between the end of the feed roller ends 3A, 3B and the roller end plates 2, 5.

A further benefit of this invention is the provision of a seal or sealing member(s) 3C to prevent semi-solid product or materials from entering into or going into the clearance area between the feed roller ends 3A, 3B and the feed roller end plate counter bores of the feed roller end plates 2, 5. The seals 3C create a positive seal between the feed roller ends 3A and the feed roller end plates 2, 5. The feed roller end seals 3C positive seal at the feed roller end 3A prevent leakage and also accumulation of the materials. The positive seal provided by seals 3C also results in a more consistent flow of semi-solid material, as the material is not diverted into a gap, resulting in greater scaling accuracy. The prior art devices have not provided for a positive sealing element but instead provide the aforementioned unsanitary clearance space between the feed roller end of the feed roller and the roller end plate.

As previously discussed, prior art machines depended on a small clearance, typically of approximately 0.010 inches that does not produce a positive seal and this often results in the migration and presence of residual semi-solid product in this clearance area so as to create an effective seal between the end of the feed roll and the mating surface of the feed roll end plate. That is in prior art machines the gap would get filled and, thereby, sealed with the material being run through the machine. In addition to preventing potential allergens and other hygienic issues with materials being retained in the gap that are found in prior art machines, the instant invention with seal 3C improves the scaling of the product by preventing loss of volume during operation as mentioned. The gap in prior art machines diverts some material from processing by allowing it to flow into the gap area and around with rotation of the roller so that the material can exit at some point other than thru the intended discharge point. This results not only the unhygienic conditions as noted but the aforementioned loss of volume which in turn causes inaccuracies in the outflow from the machine.

As shown by FIG. 3, 4 and 5, the exemplary embodiment of the instant invention allows for seals or seal arrangement 3C to be used to create a positive seal to eliminate the flow of the semi-solid material into a hard to reach clearance area, this relieves both sanitary and allergen concerns. Although there exists several methods of creating this seal arrangement, most are not usable in existing machines due to the inability of these machines to open up to allow for the servicing or access to the seal members. By utilizing the exemplary embodiment of the instant invention to allow access to feed roller seals 3C between feed roller end 3A, 3B and the feed roller end plate counter bores 8A, 8B it is now possible to provide a positive seal in this area that can be easily cleaned and maintained.

In FIG. 3, an example of a seal 3C can be seen. It can be seen that the feed roller end seal 3C is retained in a feed roll end seal grove 3D contained in feed roller end 3A and 3B. Feed roll end seal 3C is engaging against the feed roller end plate counter bore 8A, 8B of the feed roller end plates 2, 5 It can also be understood that this seal design could be reversed from female to male, so that the seal could instead be a ring retained in grooves machined into the feed roller end plate counter bores 8A, 8B and go against the surfaces of the feed roller ends of 3A This said grooves would be in a location where the counter-bores 8A, 8B of the feed roller end plate counter bores overlap the grooves of the feed roller ends 3A. In another seal assembly contemplated by the instant invention, the ends could contain consecutive machined circumferential protrusion rings that would come directly out of the feed roller ends 3A of the feed rollers 3 and mate to opposing grooves (not shown) contained in the bottom of the feed roller end counter bores 8A, 8B. The joining of these opposing grooves (not shown) in the feed roller end plate counter bores 8A, 8B constituting a tight tolerance seal mechanism referred to as a labyrinth gland.

There is also an additional option foreseen by the inventor where there are no seals used and only the previous style end clearance is used as a seal system, where this would be acceptable to most users in that the other aspects of this invention would allow for access to the end clearance area between the freed roller end 3A, 3B and the feed roller end plate counter bores 8A, 8B and thereby allow for cleaning and removal of residual materials which could contain allergens and other materials.

The result is to produce a device that allows easy access to the rotating sealing surfaces both to allow for easy sanitizing of these surfaces and to allow for easy replacement of the sealing mechanisms, should they wear out. It is well understood that alternative methods of creating this seal can be implemented creating the same sealing effect which could include but are not limited to at the feed roller end 3A of the feed rollers 3, or the roller feed end plate counter-bores 8A, 8B of the feed roller end plates 2, 5.

Operation of the device is similar to long standing prior art machines where you place a semi solid material 11 in the hopper 1 of the instant of the invention. The feed rollers 3 counter rotate toward one another by means of a mechanical drive device. By counter rotating the feed rollers 3 towards the top in the hopper to come in contact with the semi solid materials 11 then rotate, rotating downwards and towards each other and the center gap between the 2 feed rollers 3 the semi solid materials are entrained, pressed into the grooves of the feed rollers 3 and brought down and between the horizontal center line gap area commonly referred to as the pinch point of the fed rollers 3.

At this center pinch point area the semi solid materials are gripped tightly to the surface of the rollers due to the pressure exerted upon them by the wedging together of the rollers as they counter rotate from the top open area position to the constrained pinch point area. This pressure and mechanical drive allows the semi solid materials 11 to be driven thru the pinch point area and exit on the other side as the roller surfaces tend to part from each other or the width or gap between the roller surfaces starts to increase. Once the semi Solid materials 11 have passed thru this gap area they may be taken as having been formed into a sheet as in the case of pie or pastry dough and then further processed by other machines as a sheet material.

In the case of cookie dough this semi solid material 11 would exit from the pinch point at a higher pressure than compared to the entry point. This higher pressure due to the traction and pressures created by movement thru the pinch point prevents or does not allow for the semi solid materials to go back towards or thru the pinch point but rather the semi solid materials must continue to move further thru the instant invention and into the die 7a where the semi solid materials are formed by the shape of the passage in the die as the semi solid materials pass thru the passage of the die. The die passages are typically shaped to take the semi solid materials from the open cavity bounded by the feed rollers 3, feed roller end plates 2, 5 the scrapers 7 and the die in a longer strip type cavity.

The semi solid materials flowing thru this cavity are then split into the number of passages in the die and the top opening of the die passages are typically shaped to be as close to each other as possible and to have a minimized top edge area which the semi solid material 11 flow may be disturbed by as it flows form the previously described cavity into the individual passages of the die passages. Typically the passage will have a shape that is transitional going from a top rectangular entry to a round or oval discharge. As the dough flows through this port it changes its shape by the progressively changing shape of the die passage to exit in the shape of the discharge end of the die passage. As the semi solid materials emerge from the end of the die passage. They will flow out for a predetermined amount of time to reach a desired length at which time a device will move forward with a cutter to cut off the protruding extruded portion of semi solid material. The typical cuter being a tensioned piece of high tensile strength wire on a holder or a guillotine blade that as the cutting device moves forward it passes thru the extruded semi solid material and cuts it off into a portion.

The invention is described in detail with respect to preferred or exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A semi-solid food product metering device comprising:
    at least two counter rotating feed rollers each with two ends, a distal end and a proximal end;
    at least two feed roller end plates, a first of the at least two roller end plates being a distal feed roller end plate at the distal end of the at least two counter rotating feed rollers and a second of the at least two roller end plates being a removable end plate at the proximal end of the counter rotating feed rollers with an at least one fastening device to fasten the at least two feed roller end plates in an operational position;
    a feed roller shaft for each of the at least two counter rotating feed rollers such that when transitioning from the operational position to a non-operational position the movement, removal or movement and removal of the at least two counter rotating feed rollers moves the at least two counter rotating feed rollers on each of the respective feed roller shafts such that the second of the at least two roller end plates is moved away from the ends of the at least two feed rollers to allow for movement of one of the at least two counter rotating feed rollers out of a counter bore in at least one of the at least two roller end plates;
    an at least one frame support, wherein the semi-solid food product metering device has the non-operational position and the operational position and is transitioned therebetween by a user, such that
        when in the operational position the semi-solid food product metering device is in operation and an at least one support bar supports the at least two feed roller end plates in the operating position with an at least one affixing device securing the end plates and,
        when in the non-operational position, the device is not in operation, the affixing device is not securing the end plates and allows for movement, removal, or movement and removal of the second of the at least two end plates away from the end of the two counter rotating feed rollers to provide access to a gap between the at least two counter rotating feed roller ends and the two end plates in the non-operational position.

2. The semi-solid food product metering device of claim 1, wherein when transitioning from the operational to the non-operational position, the second of the at least two roller end plates is moved away from the ends of the at least two feed rollers to allow for movement of one of the at least two counter rotating feed rollers out of a counter bore in the first feed roller end plate.

3. The semi-solid food product metering device of claim 1, wherein the first of the at least two roller end plates and the second of the at least two roller end plates further comprise mating counter bores for each of the respective feed roller shafts and having end supports for each of an end of feed roller shaft or an at least one bearing member for each of the respective feed roller shaft.

4. The semi-solid food product metering device of claim 2, wherein the first feed roller end plate further comprises an at least one bore coupling to and holding a hopper and a pivot rod, wherein when transitioning from the operational position to the non-operational position the hopper is moved and rotated about the pivot rod to a non-operational position.

5. The semi-solid food product metering device of claim 1, wherein the at least two feed roller end plates contain counter bores which the distal and proximal feed roller ends fit into and further comprising seal members which provide a barrier to the movement of materials from in between the feed rollers and the feed roller end plate counter bores.

6. The semi-solid food product metering device of claim 1, wherein the semi-solid food product metering device provides a positive sealing element at each of the ends of the two counter rotating feed rollers, the positive sealing elements being engaged in the operating position and disengaged in the open position.

7. The semi-solid food product metering device of claim 2, wherein the respective feed roller distal and proximal ends extend into mating distal and proximal counter bores contained in the first and second roller end plates as each of the feed roller ends fits into the counter bores of the roller end plates and they engage with a feed roller seal area or seals or seal members that are constructed so as to produce a positive seal between the respective feed roller ends and the feed roller end plate counter bores of distal feed roller end plate, a feed roller shaft support bearing and the first of the at least two feed roller end plate.

8. The semi-solid food product metering device of claim 5, wherein the positive sealing element further comprises a counter bore in each of the two end plates receiving the ends of the two counter rotating feed rollers to provide a positive seal when in the operating position and the positive sealing element is engaged in the operating position to provide the positive seal and prevent leakage of the semi-solid food product from between the at least two counter rotating feed rollers and the at least two feed roller end plates.

9. The semi-solid food product metering device of claim 5, wherein the positive sealing element further comprises feed rollers fitted with end seal members that fit into grooves located on the outer end of the feed roller ends or rings contained in the at least two feed roller end plates when the device is in the operating position.

10. A method of operating a semi-solid food product metering device comprising the steps of:
- operating the semi-solid food product metering device in an operating position to meter semi-solid food product, the semi-solid food product metering device having a pair of counter rotating feed rollers having a distal and a proximal end, two roller end plates at the distal end and the proximal end of the feed rollers and making a positive seal therewith, an at least one support bar having the end plates supported thereon a fastening device holding the proximal feed roller end plate which when removed allows for disengaging the positive seal with the end plate and opening a gap or access for sanitation and allergen removal;
- switching the semi-solid food product metering device to a non-operating position, wherein the fastening device is activated and a sliding away or removing the proximal end plate is effected which allows for longitudinal movement of the feed roller along a feed roller shaft and further allowing for disengagement of the feed roller from the distal end plate and opening of a gap to allow for sanitation access to a distal end plate counter bore; and
- a sanitation tep performed while the semi-solid food product metering device is in the non-operational position.

11. The method of operating a semi-solid food product metering device of claim 9, wherein the method step of operating further provides the positive seal with a sealing element at each of the ends of the two counter rotating feed rollers, the positive sealing elements being engaged in the operating position and wherein in the method step of activating, the disengaging of the positive seal with the endplate further comprises disengaging the positive sealing elements in the open position.

12. The semi-solid food product metering device of claim 8, wherein positive sealing members further comprise at least one of consecutive machined circumferential protrusion rings that come directly out of the feed roller ends of the at least two feed rollers and mate to opposing grooves, o-rings, and sealed bearing members.

13. The semi-solid food product metering device of claim 2, further comprising a feed roller retaining ring, the retaining ring being removable when transitioned to the non-operating position and which retains at least one of the at least two retaining rings as the device transitions from the operational position to the non-operational position.

14. The semi-solid food product metering device of claim 2, wherein when in the non-operating position, with the removable end plate removed and a first of the at least two feed rollers slid out of counter bore in the first feed roller end plate, the first feed roller of the at least two rollers is moved along a feed roller drive shaft, the feed roller drive shaft having an axis about which it and the first roller spin, till the first feed roller of the at least two feed rollers is clear of a feed roller drive coupling so as to allow the first feed roller of the at least two feed rollers to freely spin about the axis of the feed roller drive shaft for the purpose of cleaning the feed roller.

* * * * *